United States Patent [19]
Guile et al.

[11] Patent Number: 5,451,554
[45] Date of Patent: Sep. 19, 1995

[54] ACTIVATED CARBON BODIES HAVING EPOXY RESIN AND BENTONITE BINDERS

[75] Inventors: Donald L. Guile; Shy-Hsien Wu, both of Horseheads, N.Y.

[73] Assignee: Corning, Inc., Corning, N.Y.

[21] Appl. No.: 105,139

[22] Filed: Aug. 12, 1993

[51] Int. Cl.$^6$ .......................... B01J 21/16; B01J 21/18
[52] U.S. Cl. ..................................... 502/80; 428/408; 502/159; 502/180; 502/418; 502/429
[58] Field of Search ................. 502/80, 159, 180, 416, 502/418, 429; 428/408

[56] References Cited

U.S. PATENT DOCUMENTS

| | | |
|---|---|---|
| 3,922,412 | 11/1975 | Yoshikawa et al. |
| 4,259,299 | 3/1981 | Hagiwara et al. ................... 423/210 |
| 4,518,704 | 5/1985 | Okabayashi et al. ................ 502/80 |
| 5,190,696 | 3/1993 | Fujii et al. ............................ 502/404 |
| 5,306,675 | 4/1994 | Wu et al. .............................. 502/404 |

FOREIGN PATENT DOCUMENTS 49-115110  11/1974  Japan.
57-122924  7/1982  Japan.

*Primary Examiner*—Melvyn I. Marquis
*Assistant Examiner*—D. Aylward
*Attorney, Agent, or Firm*—L. Rita Quatrini

[57] ABSTRACT

A carbon body and method for making the body. The body is characterized by carbon particles bonded together with bentonite clay and a cured epoxy resin. The bentonite content is about 5% to about 30% by weight based on carbon. The epoxy resin and curing agent content as measured before curing is about 5% to about 40% by weight based on carbon. The curing agent as measured before curing makes up about 5 parts to about 40 parts per 100 weight parts based on the epoxy resin. The resin has an average functionality of at least 3. The body has higher strength after exposure to temperatures of up to about 250° C. in air than bodies absent the bentonite and resin. Additionally, the body has the properties of surface area retention after exposure to high temperatures, and water resistance. The method for making the body involves forming an aqueous mixture comprising of in percent by weight based on carbon, about 4% to about 10% thermally gellable organic binder which can be cellulose ether(s), derivatives of cellulose ethers, and combinations of these, 0 to about 7% of co-binder, the bentonite, resin, and curing agent. The mixture is formed into a green body which is then dried, subjected to a first heat-treatment or curing, and then to a second heat treatment to restore surface area.

25 Claims, 1 Drawing Sheet

ACTIVATED CARBON BODIES HAVING EPOXY RESIN AND BENTONITE BINDERS

This invention relates to carbon bodies having bentonite clay and epoxy resin as binders, and to the method of making them. The bodies of the present invention by virtue of these binders have strength after exposure to high temperature, and are water resistant. Additionally, their surface area is retained after exposure to elevated temperatures thus allowing them to efficiently adsorb hydrocarbons in elevated temperature environments.

BACKGROUND OF THE INVENTION

Activated carbon materials are commonly used to adsorb hydrocarbons and other impurities from gas streams (frequently air) and liquids.

For these applications, the carbon is generally used in the form of granules. While activated carbon in the form of granules can perform the desired adsorption for many applications, there are some applications in which the granules have drawbacks. In some cases back pressure is a problem with the granules since the flow must follow a tortuous path. Some applications can result in considerable wear of the granules by attrition, causing loss of material or bed packing due to the fines resulting in the blocking of the flow.

Another approach is to use an extruded activated carbon in the form of a cellular structure such as a honeycomb. These structures can readily be shaped by extruding fine powders of activated carbon with suitable binders. The honeycomb shape allows for ease of flow of the gases therethrough with little back pressure. Also, the geometry can be such as to allow easy access of the gases to all of the carbon for adsorption of the species to be removed. In the use of granules, the adsorbing species must diffuse into the center of the granule. This diffusion distance can be great compared to the thickness of the web of a honeycomb. Also, since a honeycomb is a solid piece, there should be little or no wear or attrition of the carbon.

Among the uses for such activated carbon honeycombs are the adsorption of hydrocarbon vapors in automotive applications. There are two automotive applications: (1) the evaporative emissions of vapors from the fuel system and the engine intake areas, and (2) cold start application.

In the case of evaporative emissions, the activated carbon adsorbs vapors given off from the fuel system while the vehicle is not operating, such as from the expansion and contraction of gases in the fuel tank with temperature swings. During refueling, the air which is displaced from the tank carries along considerable fuel as vapors which must be captured to meet future air pollution standards. The adsorbed species are then desorbed while the engine is operating and recycled back into the engine intake to be burned. Most vehicles today have an activated carbon canister filled with the granules to take care of some sources of vapors. However, this is not adequate to meet future requirements.

In the cold start application the activated carbon adsorbs hydrocarbons emitted during the initial 90 to 120 seconds after start-up of the engine. During this start-up period, the catalytic converter is not up to temperature for converting the hydrocarbons being emitted from the engine. Once the catalytic converter is up to temperature, the activated carbon can be removed from the exhaust system in a by-pass mode. The adsorbed hydrocarbons are desorbed from the activated carbon and are fed into the engine or into the exhaust ahead of the catalytic converter where they are converted to innocuous entities. The activated carbon is thus ready to adsorb hydrocarbons during the next cold start cycle.

In order to form an activated carbon honeycomb by extrusion, the carbon must be in the form of a fine powder. This can then be mixed with a liquid such as water and suitable plasticizers and binders. This plasticized mixture is then extruded through a die into the honeycomb shape, and dried.

Organic binders such as methylcellulose provide plasticity to the mixture. Such mixtures are soft and difficult to handle in the wet as extruded state before drying. Moreover, the bodies formed from such mixtures are relatively low in strength especially at elevated temperatures such as 250° C. which are encountered in applications such as auto exhaust purification. This is a result of the degradation of the organic binders.

It is highly desirable to improve the strength of the extruded honeycomb both in the extruded state for further processing and handling and also after drying to improve performance.

Clays and resins have been used as binders in carbon mixtures to impart strength to the carbon body formed therefrom.

However, high levels of some binders result in decreased surface area in the body when used in the as formed state. As a result, the adsorption efficiency of the activated carbon decreases. This is an important consideration in hydrocarbon adsorption applications.

U.S. Pat. Nos. 4,259,299, 4,518,704, and Japanese patent application publication no. 57-122924 (1982) relate to activated carbon bodies in which clay binders are used.

U.S. Pat. Nos. 4,259,299 relates to using bentonite in activated carbon-zeolite mixtures. The material is heated to 350° C. to develop strength. Although some strength is developed, the material breaks down if in contact with water. This is because of the bentonite which absorbs water and expands causing complete breakdown of the structure.

U.S. Pat. No. 3,922,412 relates to thin-walled carbonaceous honeycomb structures made by coating metallic rods or tubes with coating material capable of being carbonized. The coating material can include epoxy resins as binders.

Japanese patent publication No. 49-115,110 (1974) relates to a carbon material honeycomb body made by mixing carbon material or carbonizable material, thermosetting resin, binder and suitable solvent to form a plastic mixture, extruding and firing. The binder can be a thermoplastic or thermosetting resin such as phenol, Formalin, etc., CMC, dextrin, etc. For increasing strength bentonite, kaolin, etc. clay materials can be mixed in.

There remains a need to produce activated carbon bodies of improved strength to allow them to function effectively in high temperature applications such as in auto exhaust purification applications without sacrificing surface area and hence adsorption efficiency. Also there is a need to produce activated carbon bodies which maintain their structural integrity when in contact with water.

SUMMARY OF THE INVENTION

In accordance with one aspect of the invention, there is provided a body made of carbon particles bonded together with bentonite clay and a cured epoxy resin. The bentonite content is about 5% to about 30% by weight based on carbon. The epoxy resin and curing agent content as measured before curing is about 5% to about 40% by weight based on carbon. The curing agent as measured before curing makes up about 5 parts to about 40 parts per 100 weight parts based on the epoxy resin. The resin has an average functionality of at least 3. The body has a higher strength after exposure to temperatures of up to about 250° C. in air than bodies absent the bentonite and resin.

In accordance with another aspect of the invention, there is provided a method for making the carbon body. The method involves forming an aqueous mixture comprising in percent by weight based on carbon, about 4% to about 10% thermally gellable organic binder which can be cellulose ether(s), derivatives of cellulose ethers, and combinations of these, 0 to about 7% of co-binder, about 5% to about 30% bentonite clay, about 5% to about 40% water dispersible epoxy resin component which is composed of an epoxy resin portion and a curing agent portion, the curing agent portion making up about 5 parts to about 40 parts per 100 weight parts based on epoxy resin portion, and the average functionality of the resin being at least 3, and the balance of the mixture being activated carbon particles. The mixture is formed into a green body which is then dried, subjected to a first heat-treatment or curing, and then to a second heat treatment to restore surface area.

DETAILED DESCRIPTION OF THE INVENTION

Figure 1:
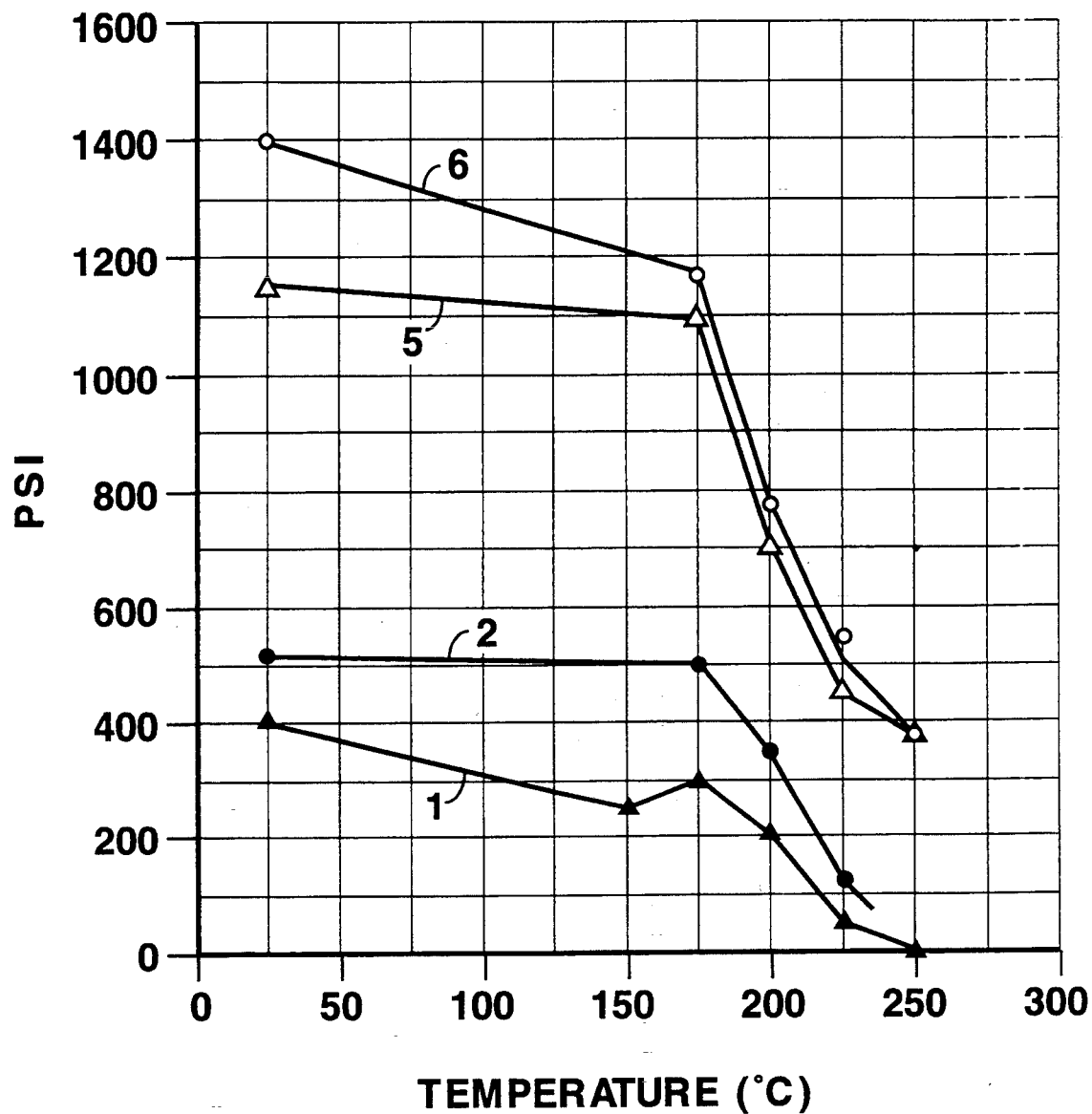
FIG. 1 is a plot of strength versus aging temperature for carbon bodies of the present invention and for bodies that do not contain bentonite and epoxy resin.

This invention relates to high temperature stable activated carbon bodies containing bentonite clay and cured epoxy resin as binders, and to method of making them. The method involves forming the body from an aqueous mixture of activated carbon particles which contains organic binder, optional additions of co-binder, and epoxy resin along with bentonite clay. The mixture is formed into a body, dried, and heat-treated.

As a result of the additions of both epoxy resin and bentonite according to the present invention, the bodies thus produced exhibit the characteristics of strength after exposure to high temperatures without sacrificing surface area and hence adsorption ability, and water resistance.

The type of carbon

Activated carbon is characterized by a very high surface area, generally above about 500 m²/g, and more typically above about 1000 m²/g, and a microstructure having a fissured surface and internal microporosity of pore sizes in the range of about 2 to about 10 angstroms. A primary tool for the characterization of activated carbon is BET surface area measurement using nitrogen adsorption.

Depending on the application, the nature of the activated carbon can vary as far as particle size, surface area, adsorption capacity for hydrocarbons, adsorption efficiency, porosity, pore size, etc. The carbon can be a single type or a blend of types based on for example, precursor source, particle size, porosity, etc.

For hydrocarbon adsorption applications, the preferred type of activated carbon is what is considered to be a collection of very small graphitic platelets which are bound together with an open structure leading to high surface area.

One source of activated carbon suitable for use in this invention is BPL F3 granular activated carbon available from Calgon Corp. which is available in several particle size ranges and at different measurements of surface area. A particular preferred variety of activated carbon from this source is the "6×16" mesh size, which can have a surface area of about 1050 to about 1300 m²/g.

Preferably, about 75% to about 85% of the activated carbon powder is fine powder having an average particle size of about 3 to about 10 micrometers in diameter, and about 15% to about 25% of the powder is coarse having an average particle size in the range of about 20 to about 50 micrometers in diameter. Especially suited to the practice of the present invention are activated carbon such as Calgon Carbon BPL-F3 ® which in the practice of the present invention is ground to an average particle size of about 5 micrometers in diameter, and Nuchar ® SN-20, a coarse powder available from Westvaco, having an average particle size of about 30 micrometers in diameter.

The organic Binder

Organic binder according to the present invention refers to thermally gellable binders: cellulose ether type binders and/or their derivatives, preferably methylcellulose, ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, and mixtures thereof. Methylcellulose and/or methylcellulose derivatives are typically used in the practice of the present invention. Methylcellulose, hydroxypropyl methylcellulose, and combinations thereof are especially preferred. Preferred sources of cellulose ethers and/or derivatives thereof, are Methocel ® A4M and 20-333 from Dow Chemical Co. Methocel ® A4M is a methylcellulose binder having a gel temperature of 50°-55° C., and a gel strength of 5000 g/cm² (based on a 2% solution at 65° C.). Methocel ® 20-333 is hydroxypropyl methylcellulose.

The co-binder polyvinyl alcohol

A co-binder can be used to enhance the plasticity characteristics of the mixture. Polyvinyl alcohol (PVA) has been found suitable to use as a co-binder.

The bentonite clay

Bentonite refers to a class of clays containing montmorillonite as the essential mineral. This type of clay contains aluminum silicate with about 3–4 wt. % MgO. This is a very fine clay which can contribute plasticity to a mixture and contribute bonding power to both the as-formed and the dried bodies. Different grades of bentonite are available from different suppliers and can vary somewhat in particle size and impurities depending on the deposit from which they come and on the degree of processing. The clay is of fine particle size for even distribution throughout the mixture. Generally the average particle size of the bentonite is less than one micrometer in diameter. Suitable bentonite clays, especially as far as fine particle size, are those which are similar to that which was in the past supplied by Georgia Kaolin under the name of Bentolite ®. Another suitable bentonite clay is supplied by Dry Branch Kaolin under the name of Bentonite K-129.

The epoxy resin component

The epoxy resin component is made up of both an epoxy resin portion and a curing agent portion.

The epoxy resin itself contains reactive epoxide functionality. It is important that the resin be a water dispersible type to ensure uniform distribution throughout the mixture.

It is critical to the practice of the present invention that the resin have an average functionality of at least 3, advantageously at least 6, and most advantageously 6 to ensure proper cross-linking in the presence of carbon powders.

One type of resin that is especially suited to the practice of the present invention is a nonionic aqueous dispersion of a polyfunctional aromatic epoxy resin (containing reactive epoxide functionality) with an average functionality of six. Such a resin is supplied by Rhone-Poulenc under the designation of RDX 84853. Another suitable resin is a nonionic aqueous dispersion of a polyfunctional aromatic epoxy resin (containing reactive epoxide functionality) with an average functionality of 3. Such a resin is supplied by Rhone-Poulenc under the designation of EPI-Rez ® W55-5003.

The resin is used with a cross-linking or curing agent. These agents are advantageously stable water dispersible or water soluble curing agents which react with epoxide groups or promote self polymerization. Several curing agents which are suitable in the practice of the present invention are aliphatic and aromatic amines, polyamides, 2-methylimidazole, and dicyandiamide. One especially suitable curing agent for the epoxy resins used in the practice of the present invention is a cycloaliphatic amine supplied by Rhone-Poulenc under the designation Epi-Cure ® 832. This is a low viscosity, modified cycloaliphatic amine capable of effecting thorough cures in epoxy resin systems at normal room temperature.

Unless otherwise indicated, the weight percents of the components and water in the mixture are based on the activated carbon content in the mixture. For example, the percent of any component or water in the mixture is calculated as follows:

$$\frac{\text{wt. of component (or wt. of water)}}{100 \text{ wt. units of activated carbon}} \times 100.$$

An aqueous mixture is formed comprising in percent by weight about 4% to about 10% of the organic binder, 0 to about 7% of co-binder, about 5% to about 30% bentonite clay, about 5% to about 40% water dispersible epoxy resin component, wherein the curing agent portion makes up about 5 parts to about 40 parts per 100 parts of the epoxy resin portion on a weight basis, and the balance of the mixture being activated carbon particles.

Other components can be present in the mixture such as forming, aids, for example extrusion aids, lubricants, and surfactants.

More advantageously the organic binder content is about 4% to about 8%, and most advantageously about 5% to about 7% by weight for optimum plasticity and from an economic standpoint.

More advantageously the co-binder, (eg., PVA) content is about 1% to about 5% by weight, and most advantageously about 1% to about 3% for optimum plasticity and from an economic standpoint.

More advantageously the bentonite content is about 5% to about 20% and most advantageously about 10% to about 15% for optimum strength. Values lower than these ranges result in decrease strength.

More advantageously, the epoxy resin component content is about 5% to about 25% and most advantageously about 5% to about 20%. Values lower than these ranges result in decreased strength. Values higher than these ranges, result in decreased adsorption capacity of the carbon body.

More advantageously, the curing agent portion of the epoxy resin component makes up about 5 to about 30 parts per 100 parts of the epoxy resin portion on a weight basis, and most advantageously about 10 parts to about 30 parts to provide the optimum amount of cross-linking in the resin.

One advantageous aqueous mixture composition which results in high strengths at elevated temperatures while preserving the surface area of the body thereby maintaining the adsorption ability for hydrocarbons comprises in percent by weight based on carbon about 4% to about 8% organic binder such as for example, methylcellulose, methylcellulose derivatives, and combinations of these, about 1% to about 5% co-binder preferably polyvinyl alcohol, about 5% to about 20% bentonite clay, about 5% to about 25% epoxy resin component, the curing agent portion making up about 5 parts to about 30 parts per 100 parts of the epoxy resin portion on a weight basis, and the balance of the mixture being activated carbon particles.

A more advantageous composition comprises in percent by weight based on carbon about 5% to about 7% organic binder such as for example, methylcellulose, methylcellulose derivatives, and combinations of these, about 1% to about 3% polyvinyl alcohol, about 10% to about 15% bentonite clay, about 5% to about 20% epoxy resin component, the curing agent portion making up about 10 parts to about 30 parts per 100 parts of the epoxy resin portion on a weight basis, and the balance of the mixture being activated carbon particles.

One especially advantageous composition which results in high strengths at elevated temperatures comprises in percent by weight based on carbon about 6% organic binder such as, for example, methylcellulose or hydroxypropyl methylcellulose, about 2% of polyvinyl alcohol, about 10% bentonite clay, about 5% to about 10% epoxy resin component, the curing agent making up about 10 to about 20 parts per 100 parts of the epoxy resin portion on a weight basis, and the balance of the mixture being activated carbon particles.

The mixture is formed by dry blending the solid components and then mixing with water. One technique of mixing, although it is to be understood that the invention is not limited to such is to place the dry blended components in a mix muller or other type of mixer such as a sigma blade or double arm mixer. While the solids are being mixed, water is added. Once the water is added, the muller or other mixer is run until the batch compacts and becomes plasticized.

The water content in the mixture can be adjusted in order to impart optimum plasticity and handleability to the mixture. As the mixture is being mixed and water is being added, a point is reached at which the water is sufficient to wet all the particles. Continued mixing compacts the powder by removing air, and the compacted powder starts to agglomerate into lumps. Continued mixing results in these lumps becoming plastic. Excess water makes these lumps too soft for the forming process. Typically, water contents of about 140% to about 180% and most typically about 160% by weight based on the carbon content impart good plasticity and handleability to the mixture.

Once the mixture is observed to be well plasticized, as indicated by hand or torque rheometer, it is formed into a body.

The bodies according to the present invention can have any convenient size and shape. For example, for hydrocarbon adsorption in engine exhaust purification, the preferred shape is a cellular body such as a honeycomb structure.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Typical wall thicknesses can be, for example, about 0.15 mm (about 6 mils) for 62 cells/cm$^2$ (400 cells/in$^2$) honeycombs. Wall (web) thicknesses range typically from about 0.1 to about 0.6 mm (about 4 to about 25 mils). The external size and shape of the body is controlled by the application.

The forming can be done by any method that makes use of shaping a plasticized mixture. The preferred method of forming is by extrusion. A ram extruder is typically used, although any extrusion equipment known in the art can be used such as a continuous auger or twin screw extruder.

In forming honeycomb structures, it is preferred to extrude the mixture through a honeycomb die.

If desired, the formed body can be cut into parts of varying sizes.

The resulting formed body is then dried at temperatures not higher than about 100° C. Because the bodies have a relatively high water content due mostly to the porosity of the carbon particles, care is taken to ensure that the bodies dry slowly and evenly so that they do not crack.

One preferred drying technique involves wrapping the bodies in aluminum foil and placing them in a dryer set at no higher than about 100° C., typically at about 95° C. for a sufficient time to remove the water. The foil creates a humid environment so that the extruded bodies dry slowly and uniformly thus preventing cracking. Drying time can vary depending on the size of the body. For a 2.54 cm (1") diameter, 22.9 cm (9") long honeycomb, the drying time is typically about 4 days.

The dried body is then subjected to a first heat-treatment at conditions of temperature and time sufficient to cure or cross link the resin. It is to be understood that curing times and temperature depend on the nature and amount of resin and curing agent. However, typically the curing temperatures are from about 25° C. to about 180° C., usually about 120° C. in a conventional oven in ambient atmosphere for about 30 minutes to about 60 minutes.

The resulting first heat-treated body is then subjected to a second heat-treatment to restore surface area to the body which might have been lost by the presence of the binder, clay, and resin. The temperatures for this heat-treatment step are usually about 250° C. to about 300° C. for about 2 hours to about 6 hours in air. The second heat-treatment temperature is more advantageously about 275° C. to about 280° C. It has been found that for a comparable composition, bodies aged at about 250° C. after being subjected to the second heat-treatment temperatures of about 275° C. to about 280° C. show retention of the strength they had before a second heat-treatment.

The bodies made by the method of the present invention are characterized by having the bentonite and cured resin as binders to bond the carbon particles together especially at relatively high temperatures such as about 200° C. and above. The bentonite content is essentially the same as in the starting mixture. The content of the resin after the heat-treating steps can vary from the content before the heat-treating steps. The organic binder and co-binder content are most likely reduced or decomposed because of the heat-treatments, the degree of reduction being dependent on heat-treating conditions of temperature, time, etc. The content of the organic binder is less than about 10% by weight based on the activated carbon content. The content of the co-binder is less than about 7% by weight based on the activated carbon content.

The bodies of the present invention have a higher strength after exposure to temperatures of up to about 250° C. in air than bodies absent bentonite and resin as defined by the present invention.

To more fully illustrate the invention, the following non-limiting examples are presented. All parts, portions, and percentages are on a weight basis unless otherwise stated.

EXAMPLE 1

Activated carbon mixtures were made up according to the compositions given in Table 1 with the balance being activated carbon. The activated carbon was a mixture of about 80% Calgon Carbon BPL-F3 ® and about 20% Nuchar ® SN-20. The water content in the mixtures was about 160% based on carbon. The resin used was RDX-84853.

TABLE 1

| Constituent Wt. % Based On Carbon | Sample. No. | | | | | | | | | |
|---|---|---|---|---|---|---|---|---|---|---|
| | 1* | 2* | 3 | 4 | 5 | 5a | 6 | 6a | 7 | 8 |
| Bentonite | 0 | 0 | 10 | 0 | 10 | 10 | 10 | 10 | 0 | 6 |
| Resin & Curing Agent | 0 | 0 | 0 | 10 | 5 | 5 | 10 | 10 | 20 | 20 |
| Curing Agent (PHR) | 0 | 0 | 0 | 20 | 20 | 20 | 20 | 20 | 20 | 20 |

6 Wt. % Methocel$^R$ No. 1 20-333, Nos. 2-8 A4M
2 Wt. % Polyvinyl Alcohol
*Controls Each mixture was formed by dry blending the dry constituents and thereafter adding water to form a plasticized batch. The plasticized mixtures were extruded in a ram extruder into 2.54 cm (1") diameter 22.9 cm (9") long honeycombs having 31 cells/cm$^2$ (200 cells/in$^2$) and wall thicknesses of about 0.38 mm (about 15 mil). Several honeycombs were made from each composition. Each honeycomb was wrapped in aluminum foil and dried at about 95° C. for about 4 days. The dried honeycombs that contained resin were heat-treated to cure the resin at about 120° C. in air for about 30 to 60 minutes.

Honeycomb samples of about 1.27 cm (about ½") long were cut for hydrocarbon adsorption testing and about 2.54 cm (about 1") for strength measurements.

Butane adsorption capacity was measured by placing test samples in a Vycor® tube housed inside a tube furnace having inlet and outlet ports. A 1500 volume ppm butane gas stream in a nitrogen carrier gas was introduced to the sample at a flow rate of about 4,000 cc/min. and adsorption was measured by monitoring the exit gas stream with a flame ionization detector. Adsorption at room temperature was considered complete when the calibrated detector reading had reached about 95%. The detector readings were plotted versus time and the adsorption was measured by integrating the area of each curve. The values reported for adsorption are the milligrams of butane adsorbed divided by the sample mass after testing.

The honeycombs were measured for crushing strength in a compression tester made by Tinius Olsen at a cross head rate of about 2.54 mm (about 0.1")/min. Each sample number reported is an average of measurements on four different pieces. Strengths were measured at room temperature on as-dried or on dried and cured samples which were thermally aged at the various temperatures in air for about 4 hours. Samples with no resin were not cured.

The strength values are shown in Table 2.

TABLE 2

| | Crushing Strength After Aging At Temperature (°C.) PSI | | | | |
|---|---|---|---|---|---|
| Sample No. | Dried As-cured | 175 | 200 | 225 | 250 |
| 1 | 400 | 300 | 200 | 50 | 0 |
| 2 | 510 | 500 | 350 | 110 | not measured |
| 3 | 910 | 660 | 340 | 270 | 230 |
| 4 | 1050 | 1000 | 775 | 320 | 130 |
| 5 | 1150 | 1100 | 700 | 450 | 380 |
| 6 | 1400 | 1170 | 775 | 550 | 380 |
| 6a | — | — | — | — | 350 |
| 7 | 1460 | 1460 | 1380 | 170 | 150 |
| 8 | 1460 | 1350 | 1230 | 300 | 300 |

From Table 2 it can be seen that the strength values for the bodies produced by the present invention, Nos. 5 and 6, are higher than the other samples after aging at the higher temperatures. Although the strength of some of the other samples can start out high after exposure to the lower temperatures, their strength is lower than those of the present invention after exposure to the higher temperatures. This is evident in FIG. 1 which is a plot of the data in Table 2 as strength versus the temperature for control samples 1 and 2 and inventive samples 5 and 6. The strength of control samples is extremely low or non-existent after exposure to temperatures of about 250° C. The synergistic effect of bentonite and epoxy resin of high strength after exposure to high temperatures (about 250° C.) is clearly demonstrated when Sample No. 6 is compared with Nos. 3 and 4, and when No. 8 is compared with No. 7.

Representative honeycombs of the resin and bentonite containing mixtures were measured for surface area after curing (first heat-treatment) and then after a second heat-treatment at temperatures of from about 250° C. to about 450° C. They were compared to the surface areas of control No. 2 containing no resin or bentonite. The surface area was measured by single point $N_2$ BET technique using a Flowsorb instrument (Model 2300, made by Micromeritic Inst. Corp.)

The results are given in Table 3.

TABLE 3

| | Surface Area After Heat-Treating at Temperature °C. $m^2/g$ | | | | | | |
|---|---|---|---|---|---|---|---|
| Sample No. | Dried | 120* | 250 | 275 | 300 | 350 | 450 |
| 2-Lot 1 | 980 | — | — | — | — | — | — |
| 2-Lot 2 | 1053 | — | — | — | — | — | — |
| 3-Lot 1 | 828 | — | — | — | — | — | — |
| 4-Lot 1 | — | 788 | — | — | — | — | — |
| 5a-Lot 2 | — | 902 | 1026 | 1025 | 1026 | 999 | 1009 |
| 6a-Lot 2 | — | 818 | 905 | 954 | 970 | 919 | 1015 |
| 7-Lot 3 | — | 731 | 948 | — | — | — | — |

*Curing - 30 min.
Samples after curing were heated at either 250–300° C. - 4 hrs in air, or 350–450° C. - 1 hr in $N_2$.
Various lots (Lots 1, 2, and 3) of carbon BPL-F3$^R$ were used.

The addition of bentonite (No.3) and epoxy resin (No. 4) reduces the surface area (compare with No. 2). However, the second heat-treatment greatly restores surface area, especially heat-treatment at about 250° C. to about 300° C. in air. (Compare Nos. 5a and 6a with No. 2).

The butane adsorption efficiency at about 2 minutes for No. 5 increased from about 63% before the second heat-treatment to about 81% after the second heat-treatment at about 250° C. for about 4 hour, which is similar to about 80% efficiency of No. 2, the control. The restoration of adsorption efficiency is a result of the restoration of surface area by the second heat-treatment as a result of decomposition of the Methocel and PVA.

The following tests are outlined in Table 4 below along with the resulting data.

TABLE 4

| Sample No. | 6a(1) | 6a(2) | 6a(3) |
|---|---|---|---|
| Second heat-Treatment Temp. (°C.) | — | 300 | 275 |
| Aging (°C.) | 250 | 250 | 250 |
| Strength (PSI) | 350 | 280 | 350 |

A honeycomb of composition 6a after curing was subjected to a second heat-treatment at about 300° C. for about 4 hours in air. It was then aged at about 250° C. for about 4 hours in air and subjected to the strength test, (No. 6a(2)). Results show that the strength of the second heat-treated sample, 280 psi, is lower than the 350 psi strength as given in Table 2 for sample 6a (6a(1) Table 4) which is without a second heat-treatment.

Another honeycomb of composition 6a after curing was subjected to a second heat-treatment at about 275° C. for about 4 hours in air. It was then aged at about 250° C. for about 4 hours in air, for strength measurement (No. 6a(3)). Results show that the strength of the second heat-treated sample at about 275° C. is about 350 psi, which is unchanged from the 350 psi strength as given in Table 2 for No. 6a (6a(1) Table 4) without such a second heat-treatment.

Honeycombs of compositions 5a, 6a, and 8 were soaked in water for 45 days. Integrity of the bodies, strength and shape were retained.

Control samples such as 1 and 2 would have disintegrated readily in water due to the strong affinity of the binders for water.

From both the strength and surface area results after exposure to high temperature, and the water resistance results, it can be seen that the bodies produced by the method of the present invention are superior to the other bodies.

EXAMPLE 2

The procedure of Example 1 was followed in preparing and strength testing carbon honeycombs of compositions given in Table 5. Resins having average functionalities of 3 (EPI-Rez® W55-5003) and 6 (RDX 84853) were used. The curing agent was Epi-Cure® 832.

TABLE 5

| Constituent Wt. % Based On Carbon | Sample No. 2* | 9 | 10 |
|---|---|---|---|
| Resin & Curing Agent | 0 | 20 | 20 |
| Curing Agent (PHR) | 0 | 10 | 10 |
| Resin Functionality | — | 3 | 6 |
| Strength as-dried or as-cured (PSI) | 510 | 853** | 1085** |
| Strength after aging at 225° C. for 4 hr. in air (PSI) | 110 | 228 | 710 |

6 Wt. % Methocel$^R$ A4M
2 Wt. % Polyvinyl Alcohol
*Control
**As-cured

It can be seen that the both the compositions with the resin have higher strength both before and after the 225° C. aging. The resin with the average functionality of 6 was higher in strength than that with the average functionality of 3 after both the curing and the 225° C. aging.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making a carbon body, said method comprising:
    a) forming an aqueous mixture comprising in percent by weight based on carbon,
    about 4% to about 10% thermally gellable organic binder selected from the group consisting of cellulose ethers, cellulose ether derivatives, and combinations thereof,
    0 to about 7% of co-binder,
    about 5% to about 30% bentonite clay,
    about 5% to about 40% water dispersible epoxy resin component,
      the epoxy resin component being composed of an epoxy resin portion and a curing agent portion wherein the curing agent portion makes up about 5 parts to about 40 parts per 100 weight parts based on the epoxy resin portion, and the epoxy resin portion has an average functionality of at least 3,
    and the balance of the mixture being activated carbon;
    b) forming said mixture into a green body;
    c) drying the green body;
    d) heat-treating the green body to cure the resin; and
    e) heating the body from step d to restore surface area thereto.

2. A method of claim 1 wherein said activated carbon particles consist of about 75% to about 85% fine carbon powders having an average particle size of about 3 to about 10 micrometers in diameter, and about 15% to about 25% coarse carbon powders having an average particle size of about 20 to about 50 micrometers in diameter.

3. A method of claim 1 wherein said organic binder is selected from the group consisting of methylcellulose, ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, and mixtures thereof.

4. A method of claim 3 wherein the organic binder is selected from the group consisting of methylcellulose, hydroxypropyl methylcellulose, and combinations thereof.

5. A method of claim 1 wherein the organic binder content is about 4% to about 8% by weight based on carbon.

6. A method of claim 5 wherein the organic binder content is about 5% to about 7% by weight based on carbon.

7. A method of claim 1 wherein said co-binder is polyvinyl alcohol.

8. A method of claim 1 wherein the co-binder content is about 1% to about 5% by weight based on carbon.

9. A method of claim 8 wherein the co-binder content is about 1% to about 3% based on carbon.

10. A method of claim 1 wherein the bentonite content is about 5% to about 20% by weight based on carbon.

11. A method of claim 10 wherein the bentonite content is about 10% to about 15% by weight based on carbon.

12. A method of claim 1 wherein the functionality of the resin is at least about 6.

13. A method of claim 12 wherein the functionality of the resin is 6.

14. A method of claim 1 wherein said epoxy resin component is about 5% to about 25% by weight based on carbon.

15. A method of claim 14 wherein said epoxy resin component is about 5% to about 20% based on carbon.

16. A method of claim 1 wherein the curing agent portion makes up about 5 parts to about 30 parts per 100 weight parts based on the epoxy resin portion.

17. A method of claim 16 wherein the curing agent portion makes up about 10 parts to about 30 parts per 100 weight parts based on the epoxy resin portion.

18. A method of claim 1 wherein the mixture comprises in percent by weight based on carbon about 4% to about 8% organic binder selected from the group consisting of methylcellulose, methylcellulose derivatives, and combinations thereof, about 1% to about 5% co-binder, about 5% to about 20% bentonite clay, about 5% to about 25% water dispersible epoxy resin component, the epoxy resin component being composed of an epoxy resin portion and a curing agent portion, the curing agent portion making up about 5 parts to about 30 parts per 100 weight parts based on the epoxy resin portion, and the balance of the mixture being activated carbon particles.

19. A method of claim 18 wherein the mixture comprises in percent by weight based on carbon about 5% to about 7% organic binder selected from the group consisting of methylcellulose, methylcellulose derivatives, and combinations thereof, about 1% to about 3% polyvinyl alcohol, about 10% to about 15% bentonite clay, about 5% to about 20% water dispersible epoxy resin component, the epoxy resin component being composed of an epoxy resin portion and a curing agent portion, the curing agent portion making up about 10 parts to about 30 parts per 100 weight parts based on the epoxy resin portion, and the balance of the mixture being activated carbon particles.

20. A method of claim 19 wherein the mixture comprises in percent by weight based on carbon about 6% organic binder selected from the group consisting of methylcellulose, methylcellulose derivatives, and combinations thereof, about 2% of polyvinyl alcohol, about 10% bentonite clay, about 5% to about 10% water dispersible epoxy resin component, the epoxy resin component being composed of an epoxy resin portion and a curing agent portion, the curing agent portion making up about 10 to about 20 parts per 100 weight parts based on the epoxy resin portion, and the balance of the mixture being activated carbon particles.

21. A method of claim 1 wherein the water content of the mixture is about 140% to about 180% based on the carbon content.

22. A method of claim 1 wherein the second heat treatment is done at a temperature of about 250° C. to about 300° C. in air.

23. A method of claim 22 wherein the second heat treatment temperature is about 275° C. to about 280° C.

24. A method of claim 1 wherein the forming is done by extruding the mixture.

25. A method of claim 1 wherein the body is formed into a honeycomb structure.

* * * * *